Dec. 1, 1925.

J. SCHLUMBERGER

POWER PLANT

Filed Dec. 13, 1922

1,563,405

INVENTOR.
JACOB SCHLUMBERGER
BY
Ralph W. Brown.
ATTORNEY.

Patented Dec. 1, 1925.

1,563,405

UNITED STATES PATENT OFFICE.

JACOB SCHLUMBERGER, OF MILWAUKEE, WISCONSIN.

POWER PLANT.

Application filed December 13, 1922. Serial No. 606,668.

*To all whom it may concern:*

Be it known that I, JACOB SCHLUMBERGER, a citizen of Germany, residing at Milwaukee, in the county of Milwaukee and State of Wisconsin, have invented a certain new and useful Improvement in Power Plants, of which the following is a full, clear, concise, and exact description, reference being had to the accompanying drawings, forming a part of this specification.

This invention relates to power plants in which two or more engines, particularly those of the internal combustion type, are geared to a common driven shaft.

In power plants of this character, recently developed, the engines are not infrequently disposed on the opposite sides of the axis of a main gear through which the power developed is transmitted to the power shaft. When, as in the type of engines mentioned, the power developed is of a pulsating character, serious problems are presented, due, at least in part, to the peculiar reactions upon the main gear resulting therefrom. For instance, it is quite natural to suppose that the best results would be attained when the power impulses occurring at one side of the gear alternate with those on the other side.

The present invention is predicated upon my discovery that the best results are obtainable when the power impulses applied at one side of the axis thereof occur substantially simultaneously with those on the other side. This I explain by the fact that an unbalanced power impulse applied to the main gear results in a transverse thrust upon the gear bearing, whereas two oppositely directed power impulses simultaneously applied to the gear at opposite sides of the gear axis produce a turning moment without reaction upon the gear bearing. While it is desirable that the power impulses be applied substantially simultaneously, some deviation from an exactly simultaneous timing of the impulses is permissible without sacrificing the principle of the invention.

A better understanding of the invention will be had from the following description of one embodiment thereof, as portrayed more or less diagrammatically in the accompanying drawings:

Figure 2:
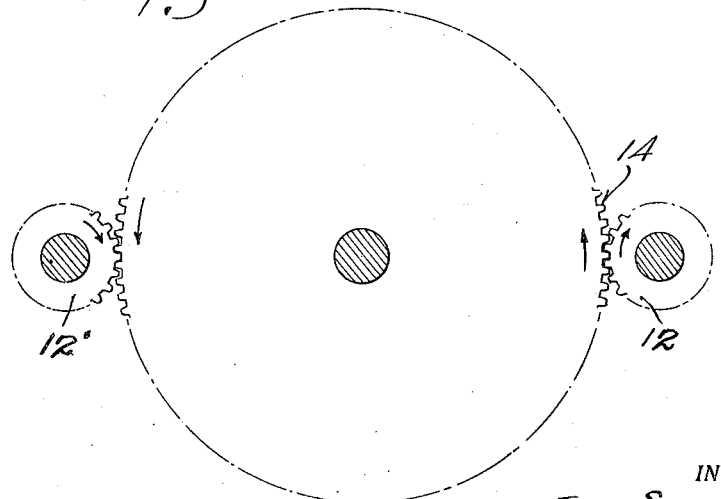
Figure 2 is a sectional view taken substantially on the line 2—2 of Figure 1.

The power plant selected for illustration comprises four oil engines A, B, C and D having independent crank shafts 10, 11, 10' and 11'. Crank shafts 10 and 11 are shown coupled to an intermediate pinion 12, while crank shafts 10' and 11' are coupled to an intermediate pinion 12'. Pinions 12 and 12' are journaled in fixed bearings 13 and 13', respectively, and mesh with a main gear 14 journaled in fixed bearings 15 therebetween. As indicated by the arrows in Figure 2, both pinions 12 and 12' are driven in the same direction so that the tooth pressures exerted thereby upon the main gear are in opposite directions.

Figure 1:
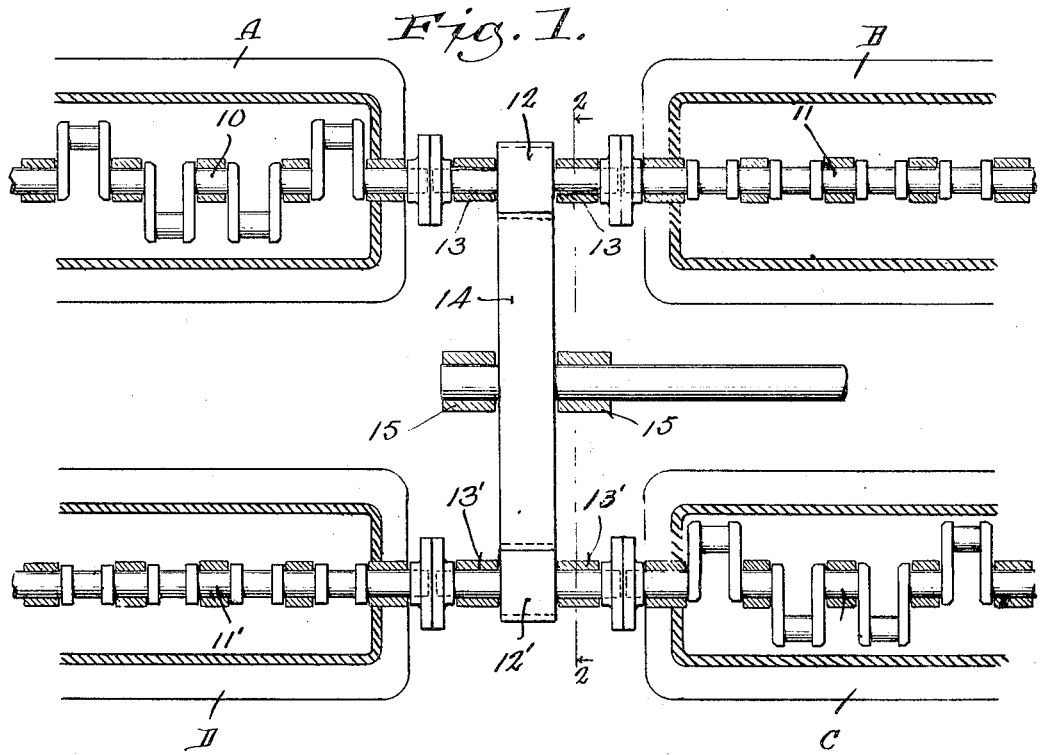
Figure 1 is a diagrammatic plan view of a power plant, illustrating one method of gearing the crank shafts of four internal combustion engines to a common power shaft driven thereby.

From an inspection of Figure 1 it will be noted that crank shafts 10 and 10' are in the same phase relation so that successive power impulses received from shaft 10 by pinion 12 and transmitted to the gear 14 occur substantially simultaneously with those received and transmitted by pinion 12' from crank shaft 10'. Similarly, the phase of crank shaft 11 is the same as crank shaft 11' so that the successive power impulses of each of these two shafts are applied substantially simultaneously to their respective pinions 12 and 12' and hence are applied simultaneously to the opposite sides of gear 14. It will be further noted that crank shaft 10 is out of phase with crank shaft 11 and, similarly, shaft 10' is out of phase with crank shaft 11', so that the power impulses received by each pinion from one shaft alternate with those received from the other shaft. Thus, although the two shafts connected with each pinion deliver their impulses alternately, the successive impulses received by each pinion occur in synchronism with those received by the other pinion and each impulse applied to the main gear at one side of the axis thereof is counteracted by a similar, oppositely directed impulse applied at the other side of the gear axis. This results in a smooth action of the main gear, due to the absence of unbalanced forces and reactions upon the gear bearings.

Various changes may be made in the embodiment of the invention hereinabove described, without departing from or sacrificing any of the advantages of the invention as defined in the appended claims.

I claim:

1. In a multiple engine power plant the combination of a driven gear, a plurality of engines disposed at opposite sides of the axis of said gear, each engine comprising a complete operating unit having a crank shaft, and driving connections including gears between said engine crank shafts and driven gear cooperating to produce a turning moment on said driven gear substantially without bearing reactions on said driven gear.

2. In a multiple engine power plant the combination of a driven gear, driving gears meshing with said driven gear, a plurality of engines each comprising a complete operating unit having a crank shaft, and driving connections between said engines and driving gears maintaining a definite phase relation between said engines such that the power impulses transmitted to one driving gear from one engine occur substantially simultaneously with the power impulses transmitted to another driving gear from another engine.

3. In a multiple engine power plant the combination of a driven gear, a pair of driving gears meshing therewith and so disposed that the axes of rotation of said driven gear and driving gears lie substantially in a common plane, and a pair of engines operating substantially in synchronism, each engine having a crank shaft connected in driving relation with one of said driving gears.

4. In a multiple engine power plant the combination of a driven gear, a pair of driving gears meshing with said driven gear, two engine crank shafts connected with each driving gear at opposite sides thereof, each driving gear receiving power impulses from one crank shaft alternating with those from another crank shaft, the impulses received by one driving gear occuring substantially simultaneously with those received by the other driving gear.

5. In a multiple engine power plant the combination of a driven gear, driving gears meshing with said driven gear at opposite sides thereof, separate complete engines for driving said driving gears, said engines having individual crank shafts so set that the power impulses applied to one driving gear occur substantially simultaneously with those applied to the other driving gear.

6. In a multiple engine power plant the combination of a driven shaft, two separate complete internal combustion engines for driving said shaft, gearing on said shaft, each engine having a crank shaft, gears on said crank shafts, respectively meshing with said gearing on said driven shaft and maintaining said crank shafts in such phase relation that the power impulses applied to one of said driving gears occur substantially simultaneously with those applied to the other of said driving gears.

In witness whereof, I hereunto subscribe my name this 6 day of December, 1922.

JACOB SCHLUMBERGER.